(12) United States Patent
van Halteren

(10) Patent No.: US 11,070,921 B2
(45) Date of Patent: Jul. 20, 2021

(54) RECEIVER WITH INTEGRATED MEMBRANE MOVEMENT DETECTION

(71) Applicant: Sonion Nederland B.V., Hoofddorp (NL)

(72) Inventor: Aart Zeger van Halteren, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 150 days.

(21) Appl. No.: 15/697,965

(22) Filed: Sep. 7, 2017

(65) Prior Publication Data

US 2018/0077501 A1 Mar. 15, 2018

(30) Foreign Application Priority Data

Sep. 12, 2016 (EP) .................................... 16188330

(51) Int. Cl.
| | | |
|---|---|---|
| *H04R 25/00* | (2006.01) | |
| *H04R 19/04* | (2006.01) | |
| *G01L 1/14* | (2006.01) | |
| *G01L 9/00* | (2006.01) | |
| *G01L 9/12* | (2006.01) | |

(Continued)

(52) U.S. Cl.
CPC .............. *H04R 19/04* (2013.01); *G01L 1/142* (2013.01); *G01L 9/0072* (2013.01); *G01L 9/12* (2013.01); *H04R 25/305* (2013.01); *H04R 25/554* (2013.01); *H04R 11/02* (2013.01); *H04R 19/016* (2013.01); *H04R 25/60* (2013.01); *H04R 2400/01* (2013.01)

(58) Field of Classification Search
CPC ....... H04R 25/00; H04R 25/70; H04R 25/554

USPC ......................................... 381/312, 314, 315
See application file for complete search history.

(56) References Cited

U.S. PATENT DOCUMENTS

| | | |
|---|---|---|
| 6,788,796 B1 | 9/2004 | Miles et al. |
| 6,831,577 B1 | 12/2004 | Furst |
| 6,853,290 B2 | 2/2005 | Jorgensen et al. |

(Continued)

FOREIGN PATENT DOCUMENTS

| | | |
|---|---|---|
| EP | 1353531 A2 | 10/2003 |
| EP | 1353531 A3 | 4/2006 |

(Continued)

OTHER PUBLICATIONS

European Extended Search Report corresponding to co-pending European Patent Application, No. 16188330.1 European Patent Office, dated Mar. 14, 2017; (4 pages).

*Primary Examiner* — Katherine A Faley

(74) *Attorney, Agent, or Firm* — Nixon Peabody LLP

(57) ABSTRACT

A receiver for a hearable, said receiver comprising a moveable membrane, and an arrangement for detecting the movements of the moveable membrane during, for example, a fitting process. The arrangement for detecting the movements of the moveable membrane may include one or more electrodes forming one or more capacitors in combination with the moveable membrane. The receiver may further include a moving armature type motor having an inductor being wounded around at least part of a moving armature. This inductor may form part of the arrangement for detecting the movements of the moveable membrane. The present invention further relates to a hearable and an associated method.

12 Claims, 5 Drawing Sheets

(51) Int. Cl.
*H04R 19/01* (2006.01)
*H04R 11/02* (2006.01)

(56) References Cited

U.S. PATENT DOCUMENTS

| | | | |
|---|---|---|---|
| 6,859,542 B2 | 2/2005 | Johannsen et al. |
| 6,888,408 B2 | 5/2005 | Furst et al. |
| 6,914,992 B1 | 7/2005 | van Halteren et al. |
| 6,919,519 B2 | 7/2005 | Ravnkilde et al. |
| 6,930,259 B1 | 8/2005 | Jorgensen et al. |
| 6,943,308 B2 | 9/2005 | Ravnkilde et al. |
| 6,974,921 B2 | 12/2005 | Jorgensen et al. |
| 7,008,271 B2 | 3/2006 | Jorgensen |
| 7,012,200 B2 | 3/2006 | Moller |
| 7,062,058 B2 | 6/2006 | Steeman et al. |
| 7,062,063 B2 | 6/2006 | Hansen et al. |
| 7,072,482 B2 | 7/2006 | Van Doorn et al. |
| 7,088,839 B2 | 8/2006 | Geschiere et al. |
| 7,110,560 B2 | 9/2006 | Stenberg |
| 7,136,496 B2 | 11/2006 | van Halteren et al. |
| 7,142,682 B2 | 11/2006 | Mullenborn et al. |
| 7,181,035 B2 | 2/2007 | van Halteren et al. |
| 7,190,803 B2 | 3/2007 | van Halteren |
| 7,206,428 B2 | 4/2007 | Geschiere et al. |
| 7,221,767 B2 | 5/2007 | Mullenborn et al. |
| 7,221,769 B1 | 5/2007 | Jorgensen |
| 7,227,968 B2 | 6/2007 | van Halteren et al. |
| 7,239,714 B2 | 7/2007 | de Blok et al. |
| 7,245,734 B2 | 7/2007 | Niederdraenk |
| 7,254,248 B2 | 8/2007 | Johannsen et al. |
| 7,286,680 B2 | 10/2007 | Steeman et al. |
| 7,292,700 B1 | 11/2007 | Engbert et al. |
| 7,292,876 B2 | 11/2007 | Bosh et al. |
| 7,336,794 B2 | 2/2008 | Furst et al. |
| 7,376,240 B2 | 5/2008 | Hansen et al. |
| 7,403,630 B2 | 7/2008 | Jorgensen et al. |
| 7,415,121 B2 | 8/2008 | Mögelin et al. |
| 7,425,196 B2 | 9/2008 | Jorgensen et al. |
| 7,460,681 B2 | 12/2008 | Geschiere et al. |
| 7,466,835 B2 | 12/2008 | Stenberg et al. |
| 7,492,919 B2 | 2/2009 | Engbert et al. |
| 7,548,626 B2 | 6/2009 | Stenberg et al. |
| 7,657,048 B2 | 2/2010 | van Halteren et al. |
| 7,684,575 B2 | 3/2010 | van Halteren et al. |
| 7,706,561 B2 | 4/2010 | Wilmink et al. |
| 7,715,583 B2 | 5/2010 | Van Halteren et al. |
| 7,728,237 B2 | 6/2010 | Pedersen et al. |
| 7,809,151 B2 | 10/2010 | Van Halteren et al. |
| 7,822,218 B2 | 10/2010 | Van Halteren |
| 7,899,203 B2 | 3/2011 | Van Halteren et al. |
| 7,912,240 B2 | 3/2011 | Madaffari et al. |
| 7,946,890 B1 | 5/2011 | Bondo et al. |
| 7,953,241 B2 | 5/2011 | Jorgensen et al. |
| 7,961,899 B2 | 6/2011 | Van Halteren et al. |
| 7,970,161 B2 | 6/2011 | van Halteren |
| 8,098,854 B2 | 1/2012 | van Halteren et al. |
| 8,101,876 B2 | 1/2012 | Andreasen et al. |
| 8,103,039 B2 | 1/2012 | van Halteren et al. |
| 8,160,290 B2 | 4/2012 | Jorgensen et al. |
| 8,170,249 B2 | 5/2012 | Halteren |
| 8,189,804 B2 | 5/2012 | Hruza |
| 8,189,820 B2 | 5/2012 | Wang |
| 8,223,996 B2 | 7/2012 | Beekman et al. |
| 8,233,652 B2 | 7/2012 | Jorgensen et al. |
| 8,259,963 B2 | 9/2012 | Stenberg et al. |
| 8,259,976 B2 | 9/2012 | van Halteren |
| 8,259,977 B2 | 9/2012 | Jorgensen et al. |
| 8,280,082 B2 | 10/2012 | van Halteren et al. |
| 8,284,966 B2 | 10/2012 | Wilk et al. |
| 8,313,336 B2 | 11/2012 | Bondo et al. |
| 8,315,422 B2 | 11/2012 | van Halteren et al. |
| 8,331,595 B2 | 12/2012 | van Halteren |
| 8,369,552 B2 | 2/2013 | Engbert et al. |
| 8,379,899 B2 | 2/2013 | van Halteren et al. |
| 8,509,468 B2 | 8/2013 | van Halteren et al. |
| 8,526,651 B2 | 9/2013 | Lafort et al. |
| 8,526,652 B2 | 9/2013 | Ambrose et al. |
| 8,831,260 B2 | 9/2014 | Parker |
| 2003/0235319 A1* | 12/2003 | Rass ............ H04R 25/407 381/312 |
| 2006/0227982 A1* | 10/2006 | Miranda ............ A42B 3/14 381/151 |
| 2011/0182453 A1 | 7/2011 | van Hal et al. |
| 2011/0189880 A1 | 8/2011 | Bondo et al. |
| 2011/0299692 A1 | 12/2011 | Rung et al. |
| 2011/0299708 A1 | 12/2011 | Bondo et al. |
| 2011/0299712 A1 | 12/2011 | Bondo et al. |
| 2011/0311069 A1 | 12/2011 | Ambrose et al. |
| 2012/0014548 A1 | 1/2012 | van Halteren |
| 2012/0027245 A1 | 2/2012 | van Halteren et al. |
| 2012/0140966 A1 | 6/2012 | Mocking et al. |
| 2012/0155683 A1 | 6/2012 | van Halteren |
| 2012/0155694 A1* | 6/2012 | Reeuwijk ............ H04R 11/02 381/396 |
| 2012/0255805 A1 | 10/2012 | van Halteren et al. |
| 2012/0303093 A1* | 11/2012 | Wouters ............ A61N 1/0541 607/57 |
| 2013/0028451 A1 | 1/2013 | de Roo |
| 2013/0136284 A1 | 5/2013 | van Hal et al. |
| 2013/0142370 A1 | 6/2013 | Engbert et al. |
| 2013/0163799 A1 | 6/2013 | Van Halteren |
| 2013/0195295 A1 | 8/2013 | van Halteren et al. |

FOREIGN PATENT DOCUMENTS

| | | |
|---|---|---|
| EP | 2046072 A2 | 4/2009 |
| EP | 2046072 A3 | 11/2009 |
| WO | 00/27166 A2 | 5/2000 |
| WO | 00/27166 A3 | 5/2000 |

\* cited by examiner

RECEIVER WITH INTEGRATED MEMBRANE MOVEMENT DETECTION

CROSS-REFERENCE TO RELATED APPLICATIONS

This application claims the benefit of and priority to European Patent Application Serial No. 16188330.1, filed Sep. 12, 2016, which is incorporated herein by reference in its entirety.

FIELD OF THE INVENTION

The present invention relates to a receiver for hearables, including hearing devices, such as hearing aids. In particular, the present invention relates to a receiver comprising an integrated arrangement for detecting and monitoring movements of a membrane of the receiver during for example a fitting process.

BACKGROUND OF THE INVENTION

Receivers suitable for hearables, such as hearing aids, are often subject to strict design constraints due to the limited space being available in hearables. The strict design constraints are of particular importance when the receivers comprise some sort of microphone unit being adapted to receive incoming sound pressure, for example when being operated in a fitting mode of operation, such as in an occlusion measurement mode.

Typically, microphone units for receiving incoming sound pressure are provided a discrete, and thereby space requiring components. In order to save space it has been suggested to use the receiver membrane as a microphone unit during the fitting process. An example of such an approach is suggested in US 2011/0299692 A1.

With reference to FIG. 9 of US 2011/0299692 A1 it can be seen that the sensitivity in the low frequency range is rather poor. This is highly disadvantageous in that the low frequency range is the important frequency range during the fitting process of a hearable.

It may be seen as an object of embodiments of the present invention to provide a compact and simple hearable receiver with an integrated microphone unit suitable for fitting processes.

SUMMARY OF INVENTION

The above-mentioned object is complied with by providing, in a first aspect, a receiver for a hearable, said receiver comprising a moveable membrane, and an arrangement for detecting movements of the moveable membrane.

Thus, the present invention relates to a hearable receiver, such as a hearing aid receiver. The term "hearable" is a hybrid of the terms headphone and wearable. The receiver according to the present invention comprises an arrangement for detecting and monitoring movements of the moveable membrane in response to incoming sound pressure. As demonstrated below detecting and monitoring of movements of a membrane of a hearable receiver is of particular importance during the fitting process of a hearable in order to configure the hearable correctly. Thus, it is advantageous that the hearable receiver according to the present invention may be operated as vibration sensor as well.

The arrangement for detecting movements of the moveable membrane may comprise one or more electrodes forming one or more capacitors in combination with the moveable membrane which forms a capacitor electrode. The capacitance of a capacitor depends on the distance between the capacitor electrodes. Thus, movements of the moveable membrane may be detected by detecting the capacitance of the one or more capacitors as a function of time.

When the receiver is operated as a sound generating receiver the moveable membrane needs to be driven by some sort of motor. The receiver according to the present invention may comprise a moving armature type motor for driving the moveable membrane in response to an incoming electrical signal. The moving armature type motor may comprise one or more inductors being adapted to move a moving armature of the motor. The one or more inductors may be wound around at least part of such a moving armature. Moreover, at least part of the moving armature may be arranged in a substantially static magnetic field which may be generated by at least one pair of permanent magnets.

The one or more inductors of the moving armature type motor may form part of the arrangement for detecting movements of the moveable membrane. As previously addressed the moveable membrane will move in response to incoming sound pressure. Movements of the moveable membrane may be transferred to the moveable armature which then moves in accordance with movements of the moveable membrane. Movements of the moving armature may induce capacitance changes between one or more inductors, which may be wounded around at least part of the moving armature, and the moveable membrane.

The arrangement for detecting movements of the moveable membrane further comprises signal processor means for processing signals from the one or more capacitors and/or one or more inductors. The moveable membrane may be electrically connected to ground.

Instead of using one or more capacitors and/or one or more inductors to detect movements of the moveable membrane the arrangement for detecting movements of the moveable membrane may comprise an accelerometer being attached to the moveable membrane. The accelerometer may be a one-axis or a multi-axis accelerometer being adapted to sense accelerations in one or more directions. The mass of the accelerometer should be as low as possible in order not to influence the acoustical properties of the moveable membrane. To comply with this the accelerometer may be a micro electro-mechanical system (MEMS).

The accelerometer may be adapted to communicate at least one of its measurements in a wireless manner. Thus, movements of the moveable membrane may be communicated to external signal processing equipment via a wireless transmission link between the accelerometer and such external signal processing equipment.

In a second aspect the present invention relates to a hearable comprising a receiver according to the first aspect. The hearable may comprise a hearing aid being selected from the group consisting of: behind-the-ear, in-the-ear, in-the-canal, invisible-in-canal and completely-in-canal.

In a third aspect the present invention relates to a method for detecting movements of a moveable membrane of a receiver for a hearable, said method comprising the steps of generating one or more signals that represent movements of the moveable membrane, and process at least one electrical signal that represents movements of the moveable membrane.

As previously mentioned detecting and monitoring of movements of a moveable membrane of a hearable receiver is of particular importance during the fitting process of a hearable in order to configure the hearable correctly.

The one or more signals that represent movements of the moveable membrane may comprise an electrical signal being a measure for one or more capacitances being formed between the moveable membrane and one or more electrodes. Alternatively or in combination therewith the one or more signals may comprise an electrical signal being a measure for one or more capacitance changes between one or more inductors, which may be wounded around at least part of the moving armature, and the moveable membrane. In terms of implementation the hearable receiver may be implemented in accordance with the description of the first aspect of the present invention.

The one or more signals that represent movements of the moveable membrane may comprise a signal originating from one or more accelerometers being attached to the moveable membrane. In order to process signals from such one or more accelerometers these signals may be provided in a wireless manner, i.e. transferred to external equipment in a wireless manner. The one or more accelerometers may involve MEMS accelerometers.

BRIEF DESCRIPTION OF THE DRAWINGS

The present invention will now be described in further details with reference to the accompanying figures, wherein.

Figure 1:
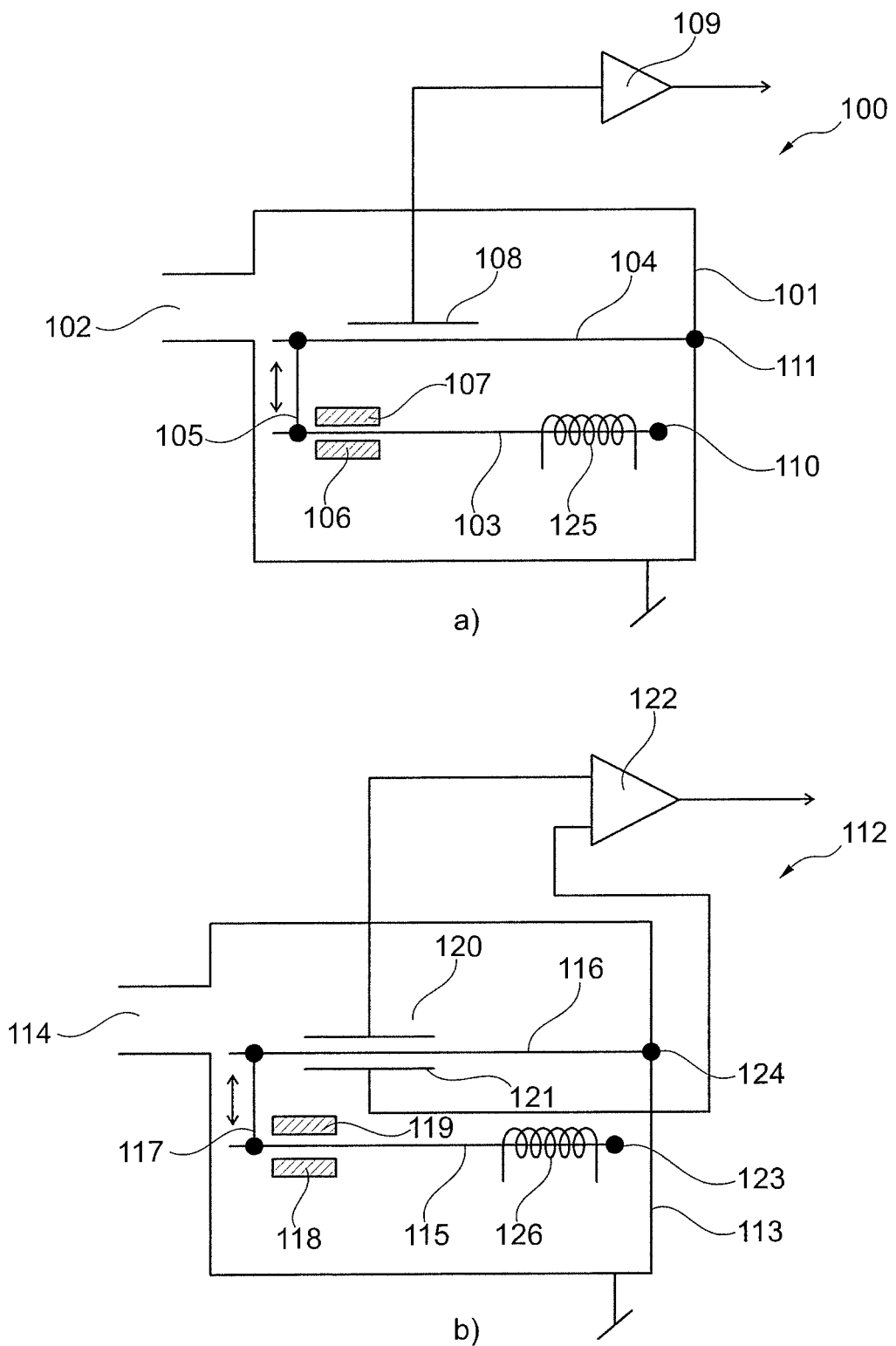
FIG. 1 shows a first and a second embodiment of the present invention.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its broadest aspect the present invention relates to a receiver for a hearable, such as a hearing aid. The receiver of the present invention comprises an arrangement for detecting and monitoring movements of at least one moveable membrane of the receiver. Detecting and monitoring of movements of a membrane of a hearable receiver is of particular importance during the fitting process of a hearable in order to configure the hearable properly.

The arrangement is preferably an integrated arrangement which may be implemented in various ways, including capacitive detection arrangements. In case of a capacitive detection arrangement changes of a capacitance is detected. Alternatively or in combination therewith, a transducer, such as an accelerometer, may be attached to the moveable membrane in order to detect movements thereof. An accelerometer may communicate its measurements to for example external processing equipment in a wireless manner.

In general, information about the movement of a receiver membrane may advantageously be used for different purposes including motional feedback within the hearable, vibration level detection in order to improve feedback in a hearable, real time check and evaluation of the performance of the receiver, identification purposes, calibration purposes, control purposes of for example an associated valve, use receiver as a microphone, own voice detection, anti-occlusion with the same sound outlet opening or with different positions of the outlet openings and/or feedback reduction.

In the following the present invention is exemplified with reference to hearable receivers containing only a single membrane. However, it should be understood that the present invention is also applicable in relation to hearable receivers containing a plurality of membranes, such as for example two membranes. In such cases the principle of the present invention may be applied to only a single membrane of the receiver, or it may be applied to all of the membranes of the receiver. Also, in case of a dual hearable receiver, i.e. a hearable receiver having two membranes, one membrane can be used to generate a signal which is then measured by the other membrane of the same hearable receiver. In case the dual hearable receiver is positioned in an ear canal the received signal will typically be modified by the acoustical load of said ear canal. Hence, a good estimate of the acoustical impedance as well as the frequency response of the ear canal can be derived from the received signal.

Referring now to FIG. 1a a first embodiment of the present invention is depicted. As seen in FIG. 1a the receiver 100 comprises a housing 101 having a sound outlet opening 102. Sound pressure may be generated by providing a drive signal to the inductor 125 whereby the armature 103 is moved up and down as indicated by the arrow. The armature 103 is mechanically hinged at one of its ends 110.

The armature 103 is rigidly connected to the membrane 104 via the mechanical connection 105. Thus, when the armature 103 moves up and down, the membrane 104 will follow its movements due to the rigid connection 105. Similarly, if an incoming sound pressure moves the membrane 104 up and down, the armature 103 will move in accordance therewith. The membrane 104 is suspended or fixated at one of its ends 111. Two permanent magnets 106, 107 are positioned on opposite sides of the armature 103. The housing 101, and thereby the membrane 104, is connected to ground.

In order to detect or monitor the movements of the membrane 104 due to an incoming sound pressure an electrode 108 is positioned substantially parallel to the membrane 104. In fact the electrode 108 may be slightly angled/tilted in order to follow the surface of the membrane 104 when it is in a displaced position.

The electrode 108 and membrane 104 form a capacitor in combination. Distance variations between the electrode 108 and the membrane 104 thus influence the capacitance whereby membrane movements can be detected. While the membrane 104 is grounded the electrode 108 may be either electrically biased or it may be an electret electrode. An electrically biased electrode may be biased by a relatively low bias voltage. An arrangement being based on an electret electrode would be characterised by high sensitivity and high linearity.

The variation of the capacitance between the electrode 108 and the membrane 104 is thus a measure for the movements of the membrane 104. A pre-amplifier 109, which may be implemented as an ASIC, processes the variation of the capacitance. Other suitable signal processing circuits may be applied as well. Alternatively, the electrode 108 may be implemented as backplate, such as an electret backplate. The electret material may also be provided on the membrane 104.

Referring now to FIG. 1b a second embodiment of the present invention is depicted. As seen in FIG. 1b the receiver 112 comprises a housing 113 having a sound outlet opening 114. Again, sound pressure may be generated by providing a drive signal to the inductor 126 whereby the armature 115 is moved up and down as indicated by the arrow. In the shown implementation the armature is mechanically hinged at one of its ends 123. However, this might not always be the case.

The armature 115 is rigidly connected to the membrane 116 via the mechanical connection 117. Thus, when the armature 115 moves up and down the membrane 116 will move in accordance therewith. The membrane 116 is suspended or fixated at one of its ends 124. Two permanent magnets 118, 119 are positioned on opposite sides of the armature 115, and the housing 113, and thereby the membrane 116, is connected to ground.

In order to detect or monitor the movements of the membrane 116 a pair of electrodes 120, 121 are positioned on opposite sides of the membrane 116. The electrodes 120, 121 are slightly angled/titled in opposite directions in order to follow the surface of the membrane 116 when it is in a displaced position.

Each of the electrodes 120, 121 forms a capacitor with the membrane 116. The capacitances of these capacitors vary with the distances between the respective electrodes 120, 121 and the membrane 116, i.e. the longer the distance the smaller the capacitance. Thus, by detecting the capacitances the membrane movements may be detected. Similar to a microphone, capacitance variations will result in voltage variations due to the applied bias. The embodiment depicted in FIG. 1b will show a smaller distortion and the differential amplifier 122 will reduce possible external noise.

Again, the electrodes 120, 121 may be either electrically biased or they may be electret electrodes. The capacitances of the two capacitors are processed in for example a differential amplifier 122 which may be implemented as an ASIC. Other suitable signal processing circuits may be applicable as well.

Figure 2:
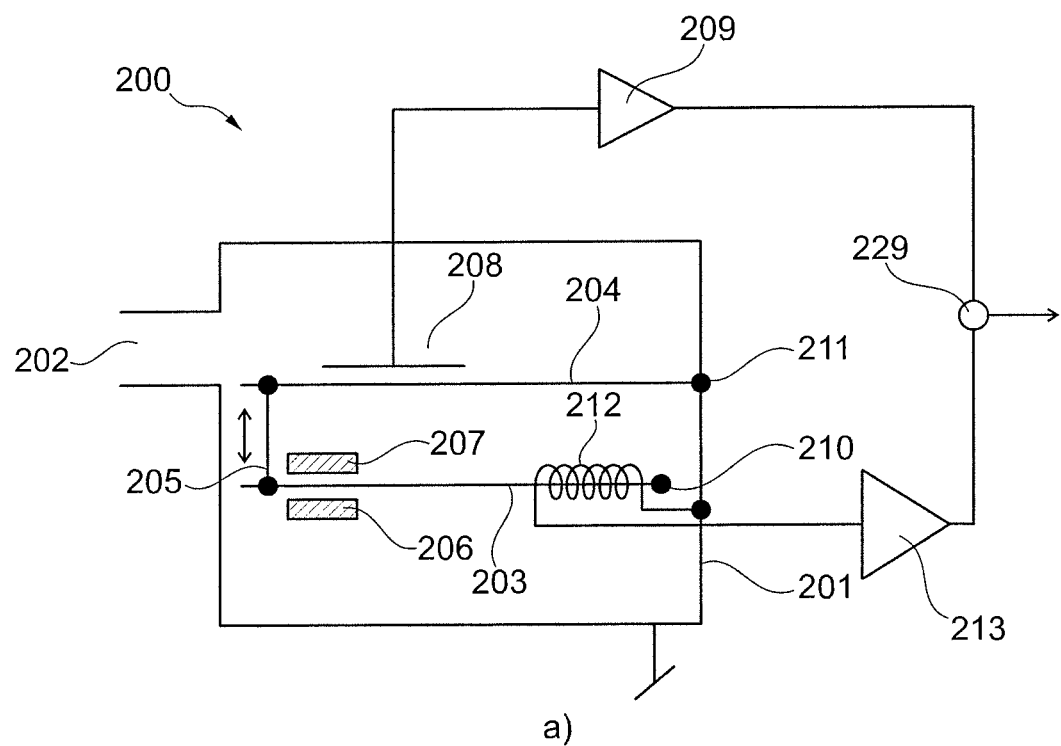
FIG. 2 shows a third and a fourth embodiment of the present invention.
Figure 2:
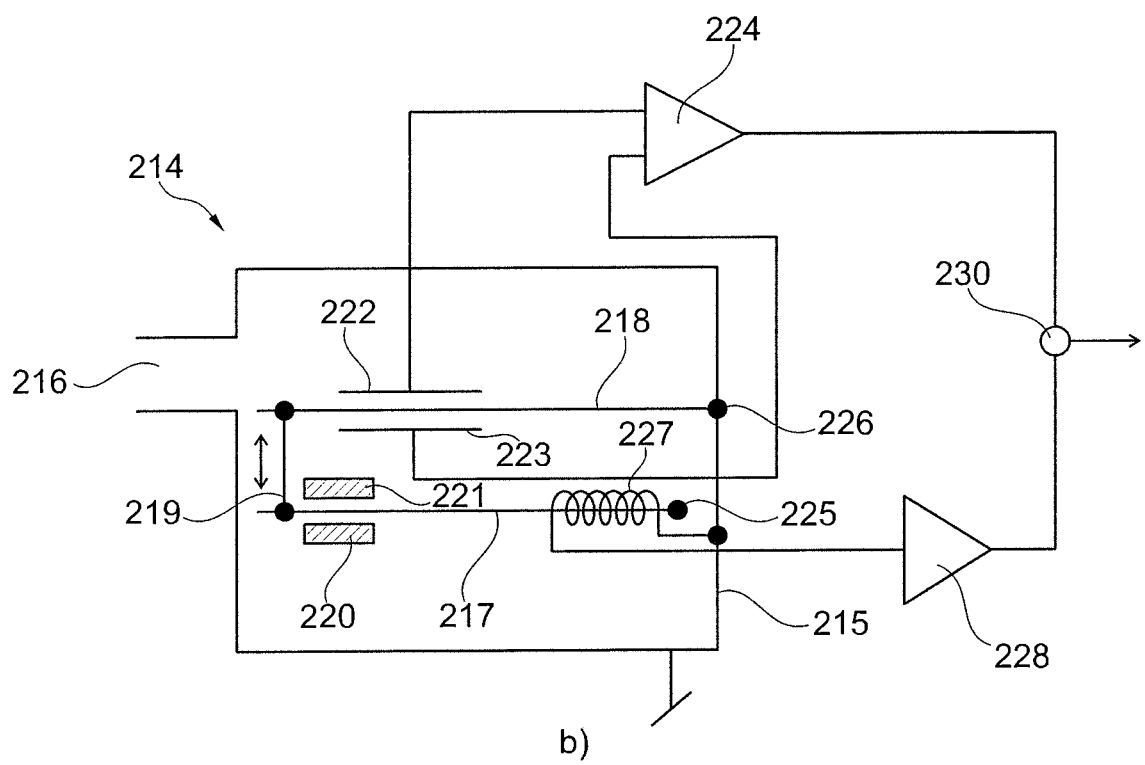

The embodiment depicted in FIG. 2a is very similar to the embodiment shown in FIG. 1a. However, in the embodiment depicted in FIG. 2a signals from both the electrode 208 and the inductor 212 are used to detect and monitor the movements of the membrane 204. As previously mentioned capacitance changes are measured via the electrode 208. The electrode 208 may be slightly angled/titled in order to follow the surface of the membrane 204 when it is in a displaced position. As to the inductor 212 the upper portion therefore may be considered an electrode so that a capacitance is formed between the membrane 204 and the upper portion of the inductor 212. In FIG. 2a the membrane 204 is connected to ground via point 211 whereas the inductor 212 is biased.

In FIG. 2a the signal from the electrode 208 is passed through pre-amp 209, whereas the signal from the inductor 212 is passed through pre-amp 213. The signals from the respective pre-amps 209, 213 are subtracted at point 229 prior to being processed even further if required. Similar to the embodiment of FIG. 1a, the embodiment depicted in FIG. 2a comprises a grounded housing 201 having a sound outlet 202, a membrane 204 suspended or fixated at 211, a moving armature 203 mechanically hinged at 210, two permanent magnets 206, 207 and a rigid connection 205 between the moving armature 203 and the membrane 204.

The embodiment depicted in FIG. 2b is very similar to the embodiment shown in FIG. 1b. As in FIG. 2a, the embodiment depicted in FIG. 2b uses the signals from the electrodes 222, 223 and the inductor 227 to detect and monitor the movements of the membrane 218. Thus, changes of three capacitances are utilized in this embodiment.

In FIG. 2b the signals from the electrodes 222, 223 are passed through differential amplifier 224, whereas the signal from the inductor 227 is passed through pre-amp 228. As disclosed in relation to FIG. 2a the upper portion of the inductor 227 acts as an electrode so that a capacitance is formed between the membrane 218 and the upper portion of the inductor 227. Similar to FIG. 2a the membrane 218 in FIG. 2b is connected to ground via point 226 whereas the inductor 227 is biased.

The signals from the respective amplifiers 224, 228 are subtracted at point 230 prior to being processed even further if required. Similar to the embodiment of FIG. 1b, the embodiment depicted in FIG. 2b comprises a grounded housing 215 having a sound outlet 216, a membrane 218 suspended or fixated at 226, a moving armature 217 mechanically hinged at 225, two permanent magnets 220, 221 and a rigid connection 219 between the moving armature 217 and the membrane 218. Again, the electrodes 222, 223 are slightly and oppositely angled/titled in order to follow the surface of the membrane 218 when it is in a displaced position.

Figure 3:
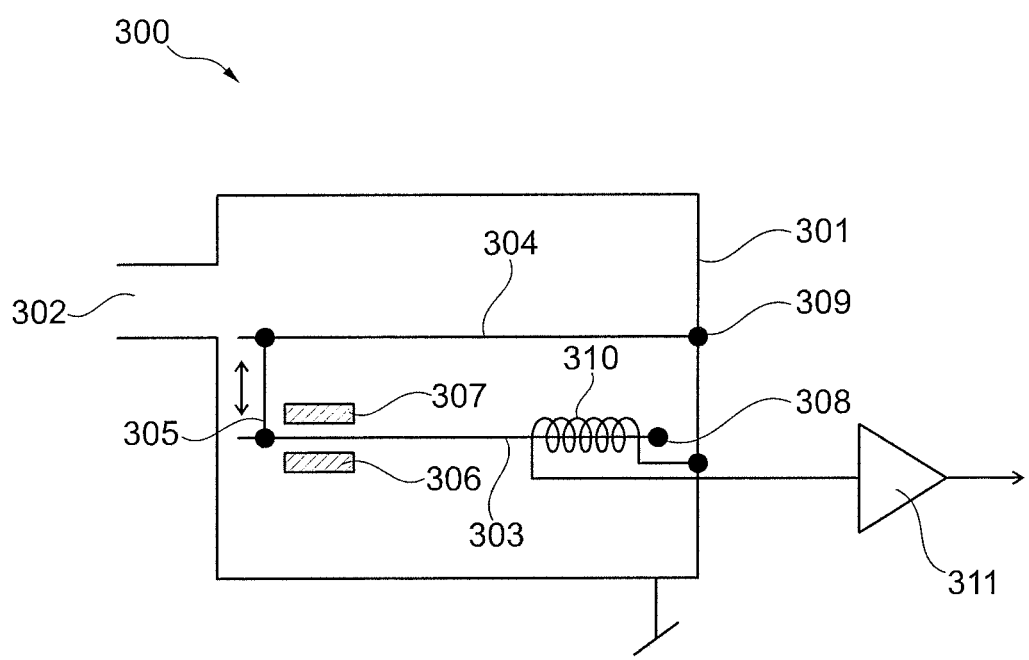
FIG. 3 shows a fifth embodiment of the present invention.

FIG. 3 depicts an embodiment where only capacitance changes between the membrane 304 and the upper portion of the inductor 310 are used to detect and monitor the movements of the membrane 304. Similar to the previous embodiments the upper portion of the inductor 310 may be considered an electrode which forms a capacitor in combination with the membrane 304. Thus, the principle depicted in FIG. 3 may be applied to standard receivers as no changes are to be made to such standard receiver. In the embodiment depicted in FIG. 3 the inductor 310 is biased with up to 20 V in case the receiver is manufactured as a MEMS device. The signal from the inductor 310 is passed through the pre-amp 311 prior to being processed further. Similar to the previous embodiments, the embodiment depicted in FIG. 3 comprises a grounded housing 301 having a sound outlet 302, a membrane 304 suspended or fixated at 309, a moving armature 303 mechanically hinged at 308, two permanent magnets 306, 307 and a rigid connection 305 between the moving armature 303 and the membrane 304.

Figure 4:
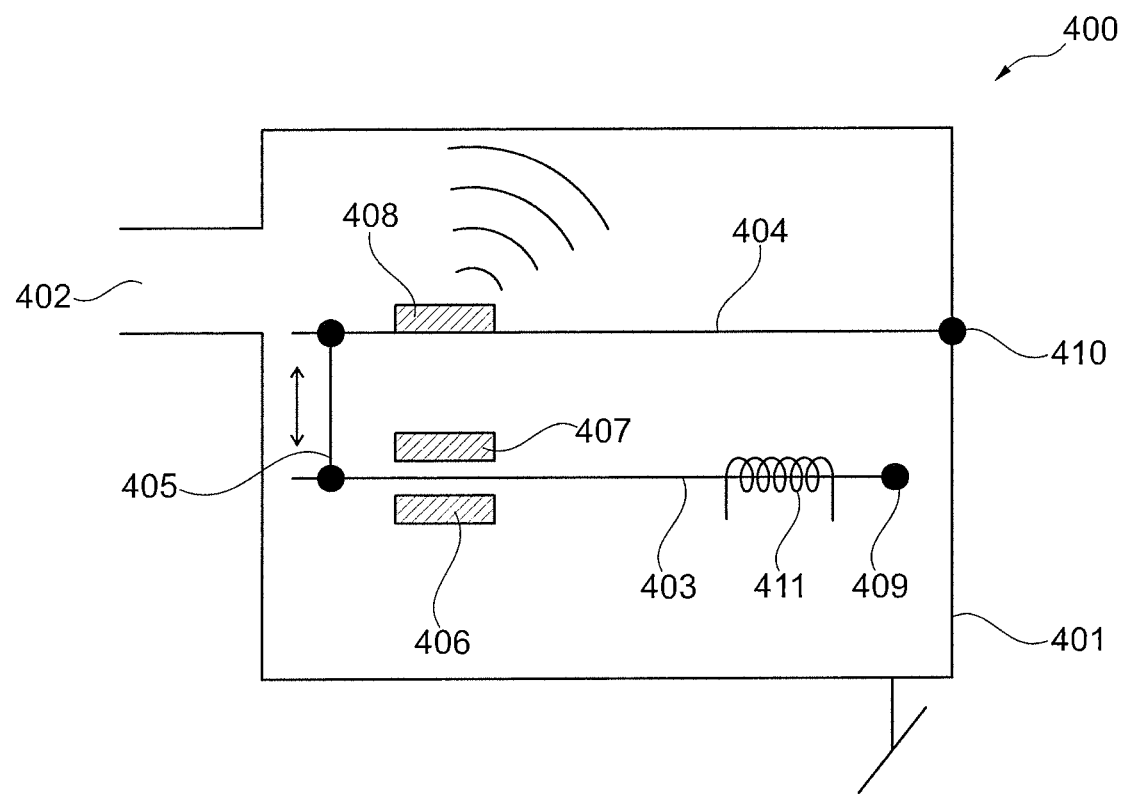
FIG. 4 shows a sixth embodiment of the present invention.

FIG. 4 depicts an embodiment where a sensor 408, such as an accelerometer, is attached to the membrane 404 in order to detect and monitor the movements thereof. The signal from the sensor 408 is communicated to external equipment via a wireless transmission link. It should be noted that a wired connection can be used as well. Similar to the previous embodiments, the embodiment depicted in FIG. 4 comprises a grounded housing 401 having a sound outlet 402, a membrane 404 suspended or fixated at 410, a moving armature 403 mechanically hinged at 409, two permanent magnets 406, 407 and a rigid connection 405 between the moving armature 403 and the membrane 404.

Figure 5:
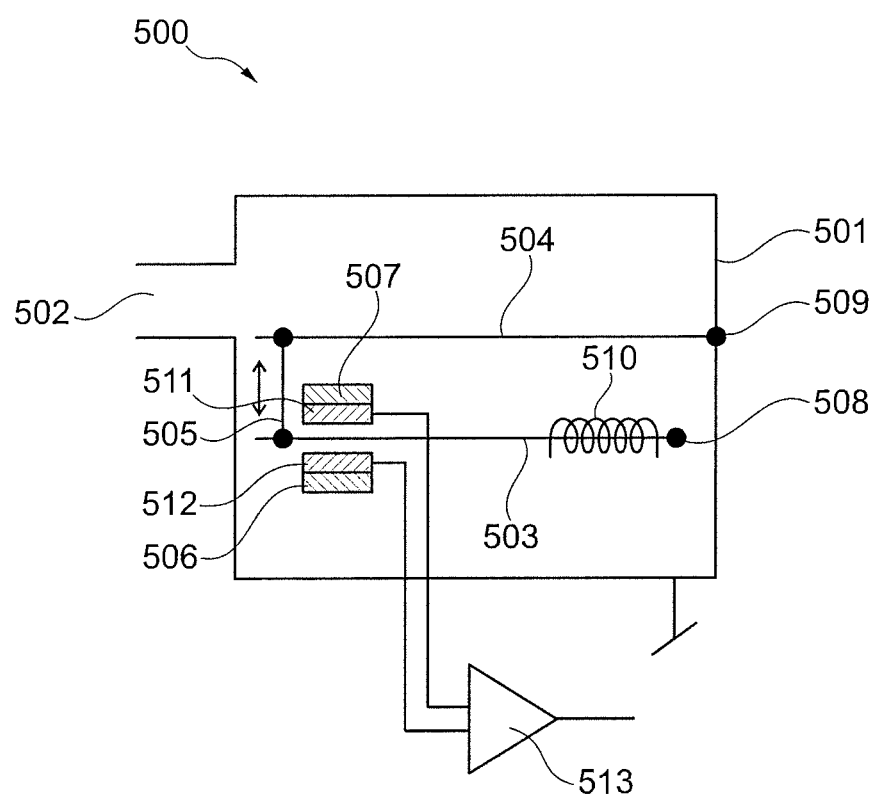
FIG. 5 shows a seventh embodiment of the present invention.

In FIG. 5 depicts an embodiment where only capacitance changes between shock plates 511, 512 are used to detect and monitor the movements of the membrane 504. The shock plates 511, 512, which are secured to respective permanent magnets 507, 506, are provided for limiting the movements of the moving armature 503 and they may be manufactured by a suitable metal or alternatively, as a laminated structure of for example plastic and metal, where the metal is biased. As the moving armature 503 moves up and down due to corresponding movements of the membrane 504 the capacitance between the shock plates 511, 512 will change. If the biased shock plates 511, 512 are connected to a differential amplifier 513 the movements of the membrane 504 monitored. The signal from the differential amplifier 513 may be passed on for further processing. Similar to the previous embodiments, the embodiment depicted in FIG. 5 comprises a grounded housing 501 having a sound outlet 502, a membrane 504 suspended or fixated at point 509, a moving armature 503 mechanically hinged at 508, two permanent magnets 506, 507, an inductor 510 and a rigid connection 505 between the moving armature 503 and the membrane 504.

As previously addressed detecting and monitoring of movements of a membrane of a hearable receiver is of particular importance during the fitting process of a hearable in order to configure the hearable correctly to the user.

The invention claimed is:

1. A receiver for a hearable, said receiver comprising
a moveable membrane,
a motor configured to drive the moveable membrane to generate sound, the motor being rigidly connected to the moveable membrane, and
an arrangement, which is separate and distinct from the motor, configured to detect movements of the moveable membrane,
wherein the arrangement includes a pair of electrodes positioned on opposite sides of the moveable membrane, wherein each of the electrodes forms a capacitor with the moveable membrane.

2. A receiver according to claim 1, wherein the motor includes a moving armature type motor for driving the moveable membrane in response to an incoming electrical signal.

3. A receiver according to claim 2, wherein the moving armature type motor comprises one or more inductors being wound around at least part of a moving armature of the motor.

4. A receiver according to claim 1, wherein the moveable membrane is electrically connected to ground.

5. A hearable comprising a receiver according to claim 1, said hearable comprising a behind-the-ear hearing aid.

6. A hearable comprising a receiver according to claim 1, said hearable comprising an in-the-ear hearing aid.

7. A hearable comprising a receiver according to claim 1, said hearable comprising an in-the-canal hearing aid.

8. A hearable comprising a receiver according to claim 1, said hearable comprising an invisible-in-canal hearing aid.

9. A hearable comprising a receiver according to claim 1, said hearable comprising a completely-in-canal hearing aid.

10. A receiver according to claim 1, wherein the motor is configured to drive the moveable membrane in response to an incoming electrical signal, whereas the arrangement is configured to detect movements of the moveable membrane due to an incoming sound pressure.

11. A receiver according to claim 1, wherein the arrangement includes a differential amplifier configured to process voltage variations resulting from capacitance variations of the two capacitors.

12. A receiver according to claim 1, wherein the electrodes are slightly angled or titled in opposite directions in order to follow a surface of the moveable membrane when the moveable membrane is in a displaced position.

* * * * *